United States Patent [19]

Jenney

[11] 4,397,197

[45] Aug. 9, 1983

[54] REVERSIBLE RIM DRIVE MECHANISM

[76] Inventor: Stoddard Jenney, 78 Summer St., Weston, Mass. 02193

[21] Appl. No.: 219,584

[22] Filed: Dec. 23, 1980

[51] Int. Cl.$^3$ .............................................. F16H 15/00

[52] U.S. Cl. ...................................... 74/202; 112/220

[58] Field of Search ..................... 74/194, 202, 25, 70, 74/82, 206; 112/220

[56] References Cited

U.S. PATENT DOCUMENTS

| | | | |
|---|---|---|---|
| 1,247,732 | 11/1917 | Shelton | 74/202 |
| 1,811,465 | 6/1931 | Geloso | 74/194 |
| 1,907,116 | 5/1933 | Jenkins | 74/194 |
| 2,850,912 | 9/1958 | Goldmark | 74/194 |
| 3,225,274 | 12/1965 | Herr et al. | 112/220 |
| 3,386,401 | 6/1968 | Johnson | 112/220 |
| 3,488,011 | 1/1970 | Iannucci | 74/194 |
| 3,815,430 | 6/1974 | Strobel et al. | 74/206 |

FOREIGN PATENT DOCUMENTS

| | | | |
|---|---|---|---|
| 2226623 | 12/1973 | Fed. Rep. of Germany | 74/194 |
| 2363628 | 11/1974 | Fed. Rep. of Germany | 74/194 |

*Primary Examiner*—Kenneth Dorner
*Attorney, Agent, or Firm*—Kenway & Jenney

[57] ABSTRACT

A reversible mechanism including a driven member with a rim having drive surfaces on its opposite sides. An elongate driving member is flexibly engageable with either of these surfaces at a predetermined position. The mechanism is useful in conjunction with a manually operated motor for controlled winding or unwinding of strands or yarns. It is also adaptable for reversal of movement by providing an extremity or extremities on the rim which, upon movement to the predetermined position, allow the driving member to disengage from one surface of the rim and to engage the other surface.

10 Claims, 3 Drawing Figures

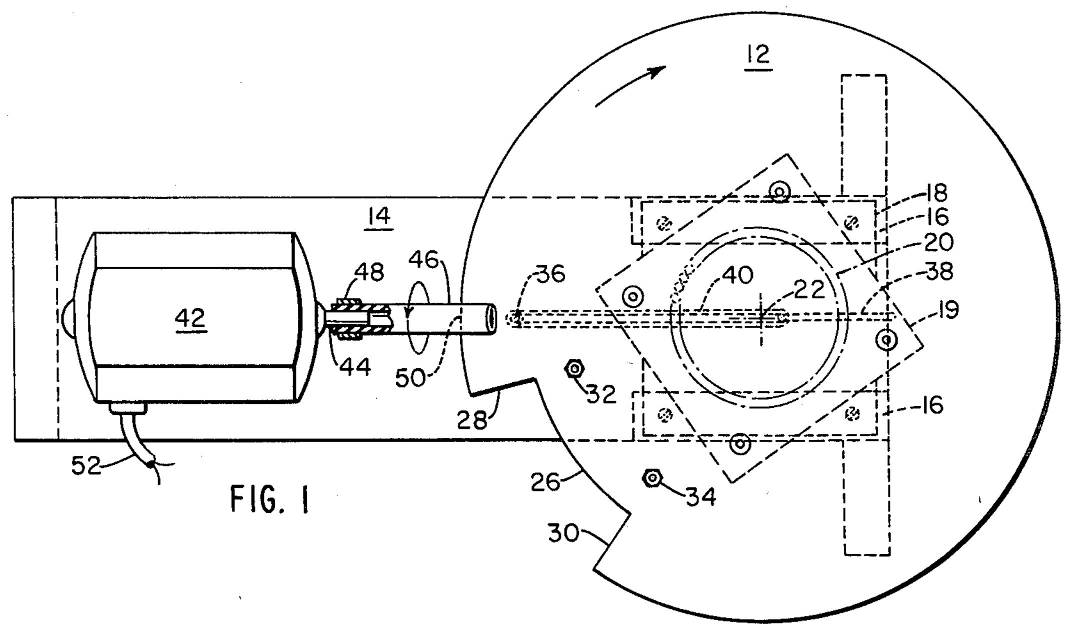
FIG. 1
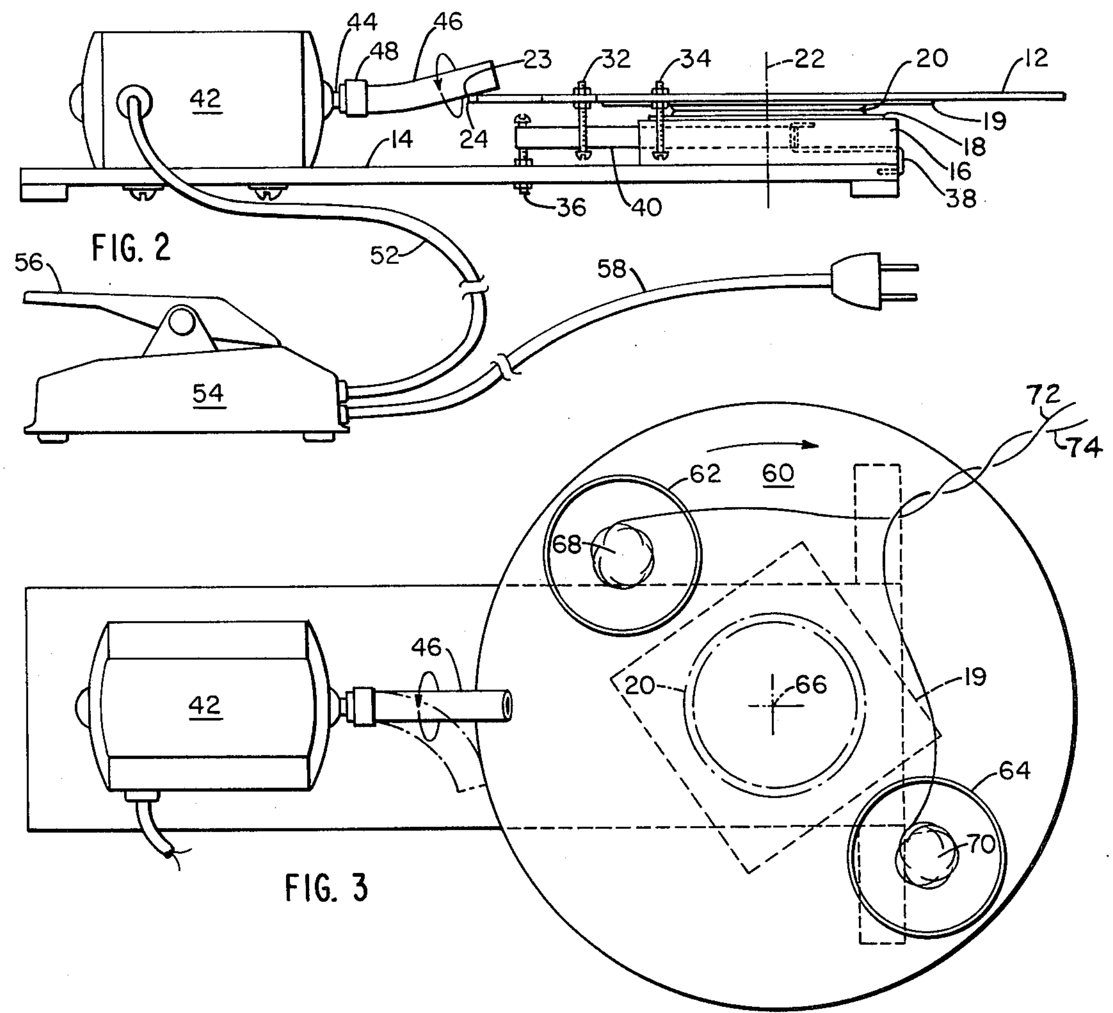
FIG. 2
FIG. 3

REVERSIBLE RIM DRIVE MECHANISM

BRIEF SUMMARY OF THE INVENTION

This invention relates generally to mechanisms reversibly driven by a unidirectionally rotating motor. More particularly, it relates to rim drive mechanisms.

Mechanisms of this type have a great variety of uses, examples of which are discussed below. Other uses will be readily apparent to those employing motor drives. A further object is to provide a simple and reliable means for effecting reversal of movement of the driven member.

In view of the foregoing objects and others hereinafter appearing, this invention features the use of an elongate drive member, for example a cylindrical tube, which is resiliently flexible in directions normal to its axis of rotation. This member is located so that it can make frictional engagement with either of two opposite surfaces on the rim of a driven member.

Other features of the invention include means for causing reversal of the driven member when an extremity on the rim reaches a predetermined position or positions in which the drive member disengages from one surface of the rim and engages the other surface.

Other features include speed control means for the control of the driving motor, and other means and adaptations of the mechanism for implementing its use according to the application at hand.

DRAWINGS

FIG. 1 is a plan view of a first embodiment of the invention having means for automatic reversal.

FIG. 2 is a side elevation corresponding to FIG. 1.

FIG. 3 is a plan view of a second embodiment adapted for manual reversal and employment as a mechanical aid in knitting.

DETAILED DESCRIPTION

FIGS. 1 and 2 show a rotating rim drive mechanism having a driven member 12 that rotates through a predetermined fraction of one complete revolution, automatically reverses and rotates in the opposite direction, reverses again and repeats the cycle. This type of mechanism is useful for operating animated signs or displays, for example. The member 12 is mounted upon a support sheet 14 by a pair of spaced rectangular blocks 16. A ball bearing comprises square plates 18 and 19 respectively secured to the blocks 16 and the member 12. The ball bearing has an annular race 20 defining the axis 22 of rotation of the member 12.

In the embodiment shown the member 12 is a flat circular plate with an annular rim defined by driving surfaces 23 and 24 on its opposite sides. As shown, these surfaces are mutually parallel, the member 12 being of uniform thickness throughout; however, it will be apparent that the surfaces 23 and 24 at the rim may be nonparallel and may have beveled, roughened or otherwise altered configurations consistently with the operations hereinafter described.

The member 12 has a segmental cut-out 26 defining a pair of extremities 28 and 30 on the rim. The extremities are functionally associated with projections 32 and 34, respectively, these projections taking the form of downwardly-projecting machine screws fastened to the member 12.

A pin 36 is mounted on the base plate 14 and a hook member 38 is engageable with the base plate, these members having a rubber band 40 stretched between them on a diametral line relative to the member 12. The rubber band 40 is located for engaging either of the projections 32 or 34. If preferred, a coil spring could be stretched between the pin 36 and the hook member 38 as a substitute for the rubber band 40.

A unidirectionally driven electric motor 42 is mounted on the base plate 14 and has a shaft 44 with an axis intersecting the axis 22 at right angles thereto. A drive member in the form of a hollow cylindrical rubber or plastic tube 46 is received over the shaft 44 and secured thereto by a hose clamp 48. The drive member 46 is flexible in directions normal to the shaft axis, whereby it can frictionally engage either of the surfaces 23 or 24 at a position 50 without creating a sufficient load on the motor bearings to cause a material effect upon its speed of rotation. As shown, the axis of the shaft 44 is parallel to the major surfaces of the member 12 and equidistant from them, whereby an equal deflection of the drive member 46 is required for engaging either of the surfaces 23 or 24.

It will be noted that reversal of this drive mechanism can be effected manually by simply bending the drive member 46 away from the driven member 12 and allowing it to engage the opposite surface of the rim resiliently. However, in the embodiment shown this reversal is automatically accomplished by reason of the cut-out 26 and related elements. Arrows in the drawing illustrate a condition in which the driven member 12 is rotating in a clockwise direction. Ultimately, this movement will cause the extremity 28 on the rim to reach the position 50. This movement results in the drive member 46 pivoting toward its normal unstressed, laterally undistorted configuration within the region defined by the cut-out 26. At the same time, the projection 32 reaches and engages the rubber band 40, and the latter applies a force to the driven member 12 in a counterclockwise direction. This produces frictional engagement of the rotating drive member with the extremity 28 on the edge thereof between the surfaces 23 and 24. As a result, the drive member 46 rolls over the edge of the member 12 at the extremity 28, again becoming laterally distorted and engaging the opposite surface 24 of the driven member. Reversal of movement is thus produced. After continued rotation a counterclockwise direction reversal is again accomplished by the projection 34 in the same manner previously described.

In place of the rubber band 40, a wire or leaf spring can be cantilever-mounted on the base plate 14 by the pin 36 so as to project toward and engage the pins 32 and 34. This spring will apply forces to the driven member 12 in the same manner as the rubber band. Alternatively, the automatic reversal feature may be disengaged by simply turning the spring so that it will not engage the pins 32 and 34. In the latter case, the inertia of the driven member 12 will carry the cut-out 26 past the drive member 46, which will then reengage the same surface 23 or 24 which it engaged before reaching the cut-out, and reversal will not occur.

It will be seen from the above description that instead of having the driven member 12 rotating about the axis 22, it can be mounted for reversible movement in some other manner adapted to cause its rim to move progressively through the predetermined position 50. For example, the axis of rotation of the member 12 may be at some angle other than 90 degrees to the motor axis, or it can be parallel thereto. As another example, the driven member may be mounted for reversible rectilinear translation in directions normal to the axis of the shaft 44. In this case, the rim of the driven member is elongate and its opposite ends comprise extremities at which the automatic reversal means described above may be operative to transfer the engagement of the drive member at the position 50 from one of the cooperating surfaces of the rim to the other.

Extending from the motor 42 is a cord 52 leading to a foot operated speed control 54 having a pedal 56. The control 56 is connected by a cord 58 to a source of electrical current. The control 54 is of a conventional form by which current does not reach the motor 42 unless the foot is depressed upon the pedal 56. The current is increased or decreased, as desired, by increasing or decreasing the pressure upon the pedal. The motor 42 has a variable speed which increases with the amount of current which it receives. Preferably, the motor 42 and control 54 are of the types commonly used as motors and foot controls for electrically operated domestic sewing machines.

FIG. 3 shows a second embodiment in the form of a foot-controlled aid for unwinding yarns during manual knitting. A driven member 60 comprises a flat circular disc similar to the member 12 of FIGS. 1 and 2, except that it does not have the cut-out 26 or projections similar to the projections 32 and 34 of FIGS. 1 and 2. The motor 42 and drive member 46 are the same as shown in FIGS. 1 and 2. Mounted on the member 60 are cylindrical cans 62 and 64, each secured to the member 60 in offset relation to its axis of rotation 66. The cans are open at the top to receive balls of yarn 68 and 70. The assembly is placed on the floor in front of a person doing manual knitting of a "Fair Isle" sweater, for example.

In operation, as knitting continues there is a normal progressive twisting of the yarns 72 and 74 as they are pulled from the respective balls 68 and 70. To untwist them periodically, it is only necessary to depress the foot pedal 56, to observe the rotation until the yarns become sufficiently untwisted, and then to release the foot pedal. For reversal of rotation, it is merely necessary to grasp the free end of the drive member 46 and bend it around the rim of the driven member 60 so that it will engage the surface of the rim on its opposite side.

I claim:

1. A drive mechanism having, in combination,
- a driven member having a rim defined by a pair of surfaces on opposite sides thereof,
- means to support the driven member for movement in either of two opposite directions to cause the rim to move progressively through a predetermined position,
- a rotary drive motor having a shaft and an elastic elongate drive member mounted on the shaft coaxially therewith, the drive member having a free end,
- and means to support the drive motor in a location for interfering engagement between said free end of the drive member and one of said surfaces at said predetermined position, the drive member including means to bend resiliently and longitudinally from one of said sides to the other while said drive motor remains in said location to cause the drive member to make frictional engagement with either of said surfaces.

2. A drive mechanism according to claim 1, in which the driven member is rotatably mounted on an axis fixed in relation to said predetermined position.

3. A drive mechanism according to claim 2, in which the axes of the driven member and the shaft intersect at right angles.

4. A drive mechanism according to claim 1, including a manually operable switch for connecting power to the drive motor.

5. A drive mechanism according to claim 1, in which the driven member is rotatably mounted on an axis fixed in relation to said predetermined position and the rim is a partial plate-like annulus.

6. A drive mechanism having, in combination,
- a driven member having a rim defined by a pair of surfaces on opposite sides thereof,
- means to support the driven member for movement in either of two opposite directions to cause the rim to move progressively through a predetermined position,
- a rotary drive motor having a shaft and an elongate drive member mounted on the shaft coaxially therewith, the drive member having a free end,
- and means to support the drive motor in a location for interfering engagement between said free end of the drive member and one of said surfaces at said predetermined position, the drive member including means to bend resiliently and longitudinally from one of said sides to the other while said drive motor remains in said location to cause the drive member to make frictional engagement with either of said surfaces, the rim having an extremity which, upon movement to said predetermined position, permits the drive member to disengage from either of said surfaces and to engage the other of said surfaces, whereby the movement of the driven member is reversed.

7. A drive mechanism according to claim 6, including means for resiliently urging said extremity toward the drive member to maintain frictional engagement therewith during its disengagement with either of said surfaces and reengagement with the other of said surfaces.

8. A drive mechanism according to claim 7, in which the last-mentioned means comprise a projection on the driven member and means in position for resilient engagement with the projection when said extremity reaches said predetermined position.

9. A drive mechanism having, in combination,
- a driven member having a rim defined by a pair of surfaces on opposite sides thereof,
- means to support the driven member for rotation about an axis in either of two opposite directions to cause the rim to move progressively through a predetermined position, said axis being fixed in relation to said predetermined position, the driven member having provision to support a plurality of bodies of yarn in offset relation to said axis,
- a rotary drive motor having a shaft and an elongate drive member mounted on the shaft coaxially therewith, the drive member having a free end,
- a manually operable switch for connecting power to the drive motor,
- and means to support the drive motor in a location for interfering engagement between said free end of the drive member and one of said surfaces at said predetermined position, the drive member including means to bend resiliently and longitudinally from one of said sides to the other while said drive motor remains in said location to cause the drive member to make frictional engagement with either of said surfaces.

10. A drive mechanism according to claim 9, in which the switch has a manual pressure-variable speed control.

* * * * *